United States Patent [19]

Miyata et al.

[11] Patent Number: 5,596,257
[45] Date of Patent: Jan. 21, 1997

[54] STEP MOTOR CONTROLLER

[75] Inventors: Hiroshi Miyata, Toyota; Katsumi Ishida, Toyoake, both of Japan

[73] Assignees: Toyota Jidosha Kabushiki Kaisha; Aisan Kogyo Kabushiki Kaisha, both of Japan

[21] Appl. No.: 243,708

[22] Filed: May 17, 1994

[30] Foreign Application Priority Data

May 20, 1993 [JP] Japan .................................. 5-142622

[51] Int. Cl.⁶ .................................................. G05B 21/02
[52] U.S. Cl. ............................................. 318/685; 318/636
[58] Field of Search .................................. 318/561, 610, 318/544, 685, 636, 696, 560

[56] References Cited

U.S. PATENT DOCUMENTS

| | | | |
|---|---|---|---|
| 4,025,837 | 5/1977 | Meier et al. | 318/685 |
| 4,312,033 | 1/1982 | Sweeney et al. | 318/594 |
| 4,634,949 | 1/1987 | Golladay | 318/696 |
| 4,833,372 | 5/1989 | Kobayashi et al. | 318/685 |
| 5,268,625 | 12/1993 | Plummer | 318/610 |
| 5,334,920 | 8/1994 | Ito et al. | 318/685 |
| 5,343,131 | 8/1994 | Baumann | 318/561 |

FOREIGN PATENT DOCUMENTS

| | | |
|---|---|---|
| 61-138855 | 6/1986 | Japan . |
| 2-261098 | 10/1990 | Japan . |

OTHER PUBLICATIONS

Wiedemann, et al., "Konstruktion elektrischer Maschinen", Springer–Verlag, Berlin/Heidelberg/ New York, pp. 510–513, 1967 (English translation enclosed).

*Primary Examiner*—John W. Cabeca
*Attorney, Agent, or Firm*—Finnegan, Henderson, Farabow, Garret & Dunner

[57] ABSTRACT

A step motor controller including a sampling program for sampling, at predetermined intervals, input target values that represent a position of the step motor. The difference between the sampled target value and a rotational position of the step motor is obtained. A step motor accelerating and decelerating program accelerates the step motor upon finding the difference between the sampled target value and the current position of the step motor is greater than a set value. When the difference is less than the set value the step motor is decelerated. The predetermined sampling time does not correspond to the natural frequency of the step motor system or to a period corresponding to a fractional multiple of the natural frequency.

15 Claims, 6 Drawing Sheets

FIG. 4

| PHASE ＼ PATTERN | 0 | 1 | 2 | 3 | 4 | 5 | 6 | 7 |
|---|---|---|---|---|---|---|---|---|
| A | 1 | 1 | 0 | 0 | 0 | 0 | 0 | 1 |
| B | 0 | 1 | 1 | 1 | 0 | 0 | 0 | 0 |
| $\overline{A}$ | 0 | 0 | 0 | 1 | 1 | 1 | 0 | 0 |
| $\overline{B}$ | 0 | 0 | 0 | 0 | 0 | 1 | 1 | 1 |

FIG. 5

| MSPD | 0 | 1 | 2 | 3 | 4 | 5 | 6 | 7 | 8 | 9 |
|---|---|---|---|---|---|---|---|---|---|---|
| DRIVING FREQUENCY (pps) | 100 | 500 | 700 | 843 | 962 | 1066 | 1160 | 1246 | 1326 | 1401 |
| EXCITATION TIME ($\mu S$) | 10000 | 2000 | 1429 | 1186 | 1040 | 938 | 862 | 802 | 754 | 714 |

STEP MOTOR CONTROLLER

BACKGROUND OF THE INVENTION

1. Field of the Invention

The present invention relates to a step motor controller for accelerating and decelerating a step motor so as to position the motor to the target stop position that changes constantly. More particularly, the invention relates to a step motor controller that reduces beat vibrations resulting from repeated acceleration and deceleration of the step motor connected thereto.

2. Description of the Related Art

Recently, there exist schemes whereby the throttle valves of automotive engines are controlled electronically using step motors. These step motors in the vehicle operate in conjunction with step motor controllers that are used extensively to control the actuation and stopping of the motors.

What is required is to control the opening of each of the throttle valves in keeping with the extent to which the accelerator is operated. The requirement is met by the step motor controller which first of all measures the amount of accelerator operation using a potentiometer or the like. The measured value of the potentiometer is sampled at predetermined intervals and converted from analog to digital format for use as the target value. The controller controls the stop position of the step motor in accordance with that target value, thereby controlling the opening of each of the throttle valves.

The difference between the step motor controller to control the stop position of the step motor for control of the throttle valve opening and ordinary step motor controllers is as follows. For one thing, the amount of accelerator operation varies constantly with the operating status of the vehicle. For another, the opening of the throttle valves needs to be controlled quickly in response to the extent to which the accelerator is operated. On the other hand, for ordinary step motor controllers, the target stop position of the step motor is not supposed to vary at short notice. Thus, with these controllers, what is important is how precisely to drive and stop the step motor to its target stop position in accordance with a predetermined speed pattern.

There have been growing needs for controllers by which to control electronically the amount of accelerator operation by use of the step motor. One such controller for controlling the step motor in opening and closing throttle valves is disclosed illustratively in Japanese Patent Laid-Open No. 138855/1986. The disclosed step motor controller involves comparing the target value designated by accelerator with the current value of the step motor and, if a difference exists between the two values, controlling the revolutions of the step motor in accordance with a previously stored table.

Conventional step motor controllers of the above kind have two major disadvantages.

(1) One major disadvantage is as follows. The step motor controller samples at predetermined intervals the measured value from the potentiometer measuring the amount of accelerator operation. The step motor is controlled so as to approach the target value thus sampled. When the target value becomes constant, the step motor is stopped. It is common practice to rotate the step motor up to the target value as quickly as possible by accelerating the motor at the start of its rotation and by decelerating it when the target value is approached. The process of repeatedly accelerating and decelerating the step motor tends to cause the step motor-driven system, including the throttle valves, to generate beat vibration. The vibration destabilizes the throttle valve positions and thus causes the flow rate of mixture intake into the engine to become unstable. As a result, the speed of the vehicle can fail to keep pace with the extent to which the accelerator is operated.

FIG. 6 is a view showing how a step motor is controlled illustratively by a conventional step motor controller, with the step motor generating vibration. In FIG. 6, reference character M represents those changes in the target value which are taken of the amount of accelerator operation by potentiometer, sampled as analog data at intervals of a predetermined sampling time A, and converted from analog to digital format. The sampling time A is generally about 6 milliseconds (abbreviated as ms hereinafter), determined in view of the tasks of the CPU that provides main vehicle control while also controlling various auxiliary devices configured.

Reference character P denotes the current step that the step motor is in. The current step P is, as shown in FIG. 6, changed step by step. MSPD indicates the condition of the driving pulses applied to the step motor. Specifically, the condition is given in terms of driving frequency and excitation time. The driving frequency and excitation time of each of the conditions given to the step motor are set forth illustratively in the table of FIG. 5. The condition made up of the two values is determined by the difference between the target value and the current position of the step motor.

When the value M varies during operation, a difference MA occurs between the target value and the current position of the step motor. The step motor is then accelerated from MSPD=1 to MSPD=2 to eliminate the difference MA. As the current position of the step motor approaches the target value, the step motor is decelerated from MSPD=2 to MSPD=1 so as to reduce the vibration that will occur upon motor stop.

According to the table of FIG. 5, the total time B during which the step motor is accelerated and decelerated in the above manner amounts to 6.858 ms, as shown in FIG. 6. This is because the excitation time at MSPD=1 is 2,000 μs (2.000 ms) and that at MSPD=2 is 1,429 μs (1.429 ms).

The opening of the throttle valves controlled by the above-described step motor controller is known to generate periodic beat vibration when measured, as indicated by reference character S in FIG. 6. The beat vibration of the throttle valves destabilizes their positions and thus causes the flow rate of mixture intake into the engine to become unstable. The result is that the speed of the vehicle can fail to keep pace with the extent to which the accelerator is operated.

The beat vibration of the step motor, if promoted appreciably, can lead to an out-of-step condition in which the step motor fails to follow the command pulses. This also makes it impossible for the vehicle to keep up in speed with the extent to which the accelerator is operated.

(2) The other major disadvantage of the conventional step motor controller is as follows. When the step motor controller stops the step motor, the step motor-driven system still vibrates for some time and thereby causes the flow rate of mixture intake into the engine to be unstable for a certain period of time. This also results in the failure of the vehicle to keep up in speed with the extent to which the accelerator is operated.

In order to avoid these deficiencies, the conventional step motor controller, illustratively in reversing the step motor, is required to set the throttle valves in the target stop position and keep them there for at least 20 to 30 ms before the reversal. This corrective measure necessarily entails a delay in keeping up with the changes in the extent to which the accelerator is operated.

SUMMARY OF THE INVENTION

It is therefore an object of the present invention to overcome the above and other deficiencies and disadvantages of the prior art and to provide a step motor controller capable of minimizing beat vibration when periodically accelerating and decelerating the step motor connected thereto.

In carrying out the invention and according to one aspect thereof, there is provided a step motor controller comprising:

means for inputting target values, the target values representing a value of the rotational position at which the step motor is to be stopped; sampling means for periodically sampling the input target values after a predetermined time interval, the interval being a periodic time other than a time period corresponding to a natural frequency of the step motor drive system; means for determining a difference between the sampled target value and a rotational position of the step motor; and step motor accelerating and decelerating means for accelerating the step motor when the difference is greater than a set value and for decelerating the step motor when the difference is less than the set value.

And in a preferred structure according to the invention, the natural frequency of the system driven by the step motor ranges from 150 to 180 Hz inclusive, and the periodic time lies in a range except for 5.5 m sec–6.8 m sec corresponding to the range of the natural frequency, and the periodic time is desirably set to a range of 6.8 ms–11.0 ms.

In operation, the step motor of the invention actuates the throttle valves of the engine via a step motor-driven system. Experiments show that the natural frequency of the step motor-driven system including the throttle valves and the step motor falls within the range of 150 to 180 Hz. The sampling means of the step motor controller samples the target value from a potentiometer measuring the extent to which the accelerator is operated over time. The step motor accelerating and decelerating means calculates the difference between the sampled target value and the current position of the step motor, accelerates the step motor according to the difference calculated, decelerates the step motor when the current position of the step motor approaches the target value, and stops the step motor at the target value. Thus the acceleration and deceleration of the step motor are repeated at intervals of the sampling time.

The sampling time does not coincide with the period of 6.8 to 5.5 ms corresponding to the natural frequency of the step motor-driven system. Thus when the acceleration and deceleration of the step motor are repeated at intervals of the sampling time, the throttle valves are prevented from resonating with beat vibration. This allows the throttle valves to be controlled with precision, whereby the flow rate of air-fuel mixture intake into the engine is accurately controlled. Because there occurs little beat vibration from the throttle valves when the step motor is stopped, the vibration at motor stop time subsides in a very short time. This provides for a quick response to any new change in the amount in which the accelerator is operated.

These and other objects, features and advantages of the invention will become more apparent upon a reading of the following description and appended drawings.

BRIEF DESCRIPTION OF THE DRAWINGS

FIG. 4 is a data chart indicating typical excitation patterns of a step motor;

FIG. 5 is a data chart listing typical driving pulses for accelerating and decelerating a step motor.

DESCRIPTION OF THE PREFERRED EMBODIMENT

Figure 1:
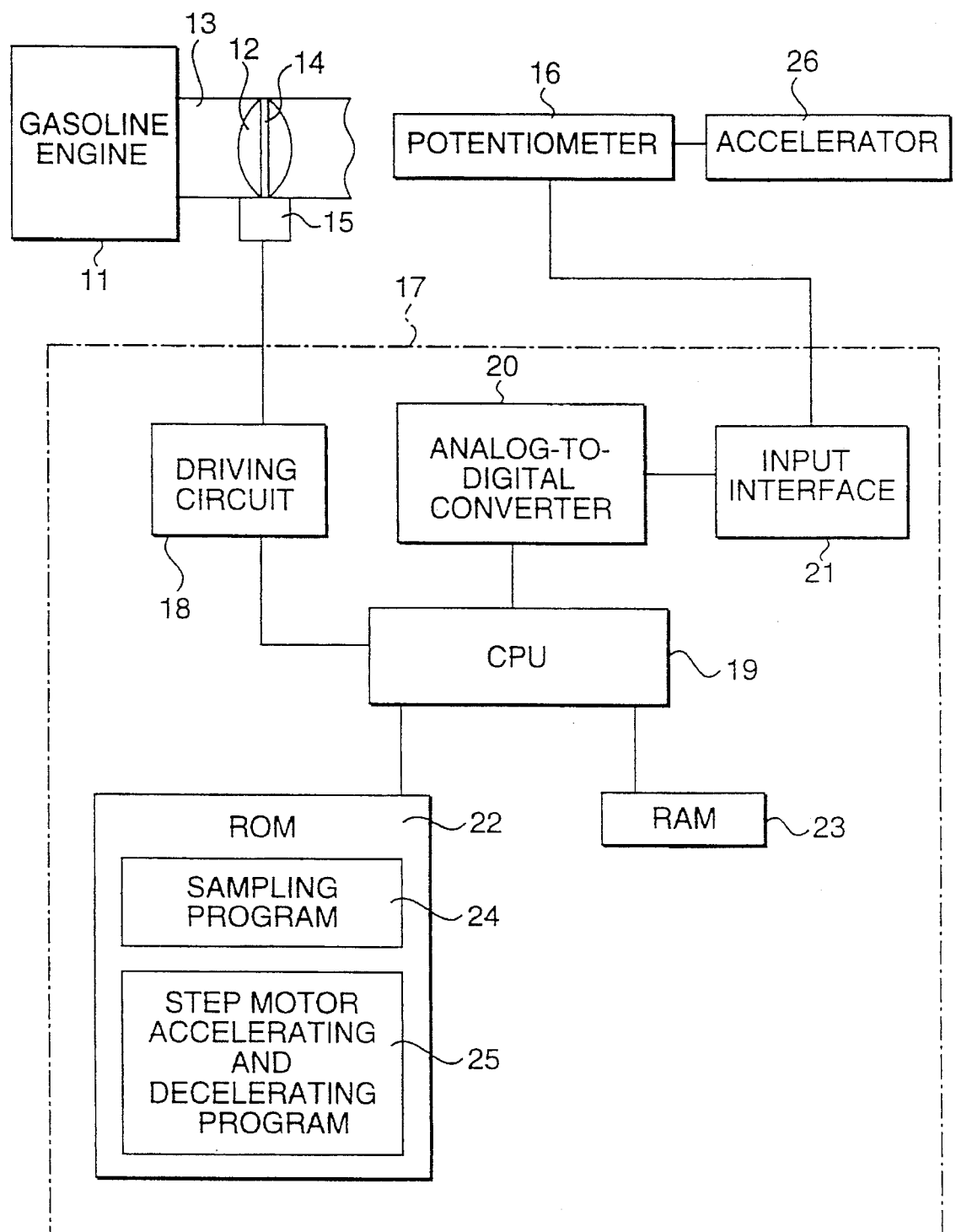
FIG. 1 is a block diagram of a step motor controller embodying the present invention.

One preferred embodiment of the invention will now be described with reference to the accompanying drawings. FIG. 1 is a block diagram of a step motor controller embodying the invention. Referring to FIG. 1, an automotive gasoline engine 11 is connected to an intake pipe 13 that admits a mixture of gasoline and air. The intake pipe 13 is equipped with a throttle valve 12 for adjusting the flow rate of air-fuel mixture into the gasoline engine 11, the valve 12 being held rotatably around a throttle shaft 14. The throttle shaft 14 is connected via a reduction gear to the output shaft of a step motor 15.

The step motor 15 is connected to a step motor driving circuit 18 in a step motor controller 17. The driving circuit 18 is in turn connected to a CPU 19 acting as an operation unit. The CPU 19 is connected to a RAM 23 for temporarily accommodating data and the like, and to a ROM 22 that stores control programs and other resources.

The ROM 22 contains a sampling program 24 that samples the acceleration data measured by a potentiometer 16 at intervals of predetermined sampling time T. The ROM 22 also accommodates a step motor acceleration and deceleration program 25. The program 25 calculates the difference between the sampled value and the current position of the step motor, causes the driving circuit 18 to accelerate the step motor 15 according to the difference calculated, decelerates the step motor 15 when its current position approaches the sampled value, and stops the step motor 15 at the sampled value.

The CPU 19 is connected to an analog-to-digital converter 20 for converting the acceleration data, analog data measured by the potentiometer 16, into digital format. The analog-to-digital converter 20 is connected via an input interface 21 to the potentiometer 16 for measuring the extent to which an accelerator 26 is operated.

The step motor controller 17 of the above constitution works as follows: When the driver of the vehicle operates the accelerator 26, the potentiometer 16 measures the amount of accelerator operation as linear analog data. The CPU 19 admits the analog data from the potentiometer 16 through the input interface 21 at intervals of the sampling time T. The data thus admitted is converted from analog to digital format by the analog-to-digital converter 20. The digitized data is placed in the RAM 23 as the sampled target value. With this embodiment, the sampling time T is, for instance, set for 8 ms.

The sampling time T is set for 8 ms because this sampling time does not coincide with any period corresponding to the natural frequency of the step motor-driven system for actuating the throttle valves 12 of the automotive engine, nor does the time T coincide with any period corresponding to the fractional multiples of that natural frequency. More specifically, the system driven by the step motor 15 has the natural frequency ranging from 150 to 180 Hz, and the fractional multiples of that frequency range from 75 to 90 Hz and from 50 to 60 Hz by multiplying the natural frequency by fractions (for example, ½ or ⅓). Thus when preset for 8 ms by the sampling program 24, the sampling time T does not coincide with the periods of 6.8 to 5.5 ms corresponding to the natural frequency (150 Hz–180 Hz), the periods of 13.3 to 11.1 ms corresponding to the frequency of 75 HZ–90 Hz, or the periods of 20.0 to 16.6 ms corresponding to the frequency of 50 Hz–60 Hz.

Figure 2:
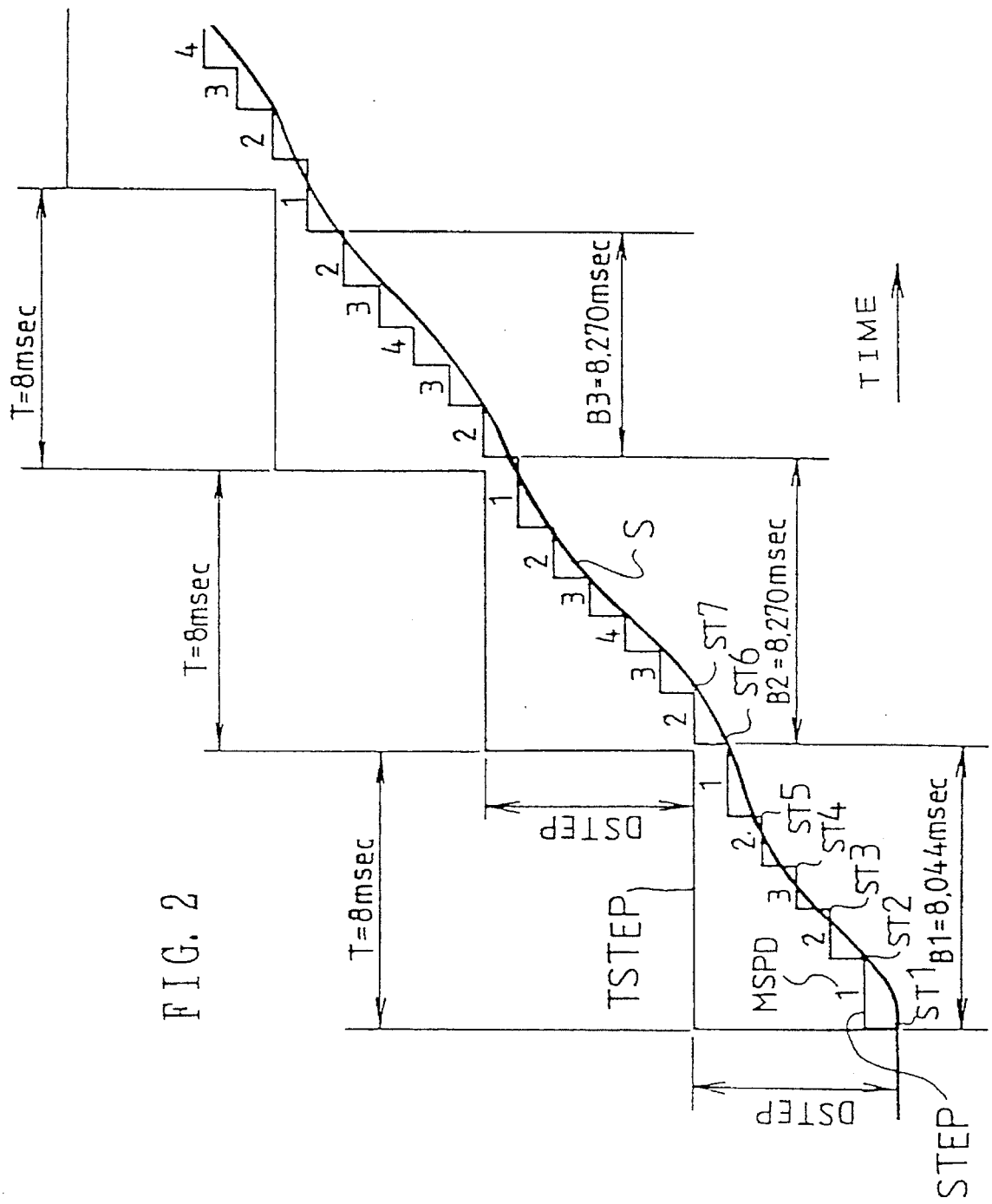
FIG. 2 is a view showing how a step motor is controlled illustratively by the embodiment of FIG. 1.

FIG. 2 shows how a step motor is controlled illustratively by the embodiment. In FIG. 2, reference notation TSTEP denotes the value measured by the potentiometer 16 at intervals of the sampling time T (=8 ms) and converted from analog to digital format. That is, TSTEP is the target step position in which the step motor for actuating the throttle valves 12 is to be stopped. Reference notation STEP indicates the step position the step motor 15 is currently in. The current step STEP is, as shown in FIG. 2, changed step by step. Reference notation MSPD represents the condition of driving pulses given to the step motor 15. Specifically, each of such conditions is composed of a driving frequency and an excitation time, as set forth in FIG. 5.

Figure 3:
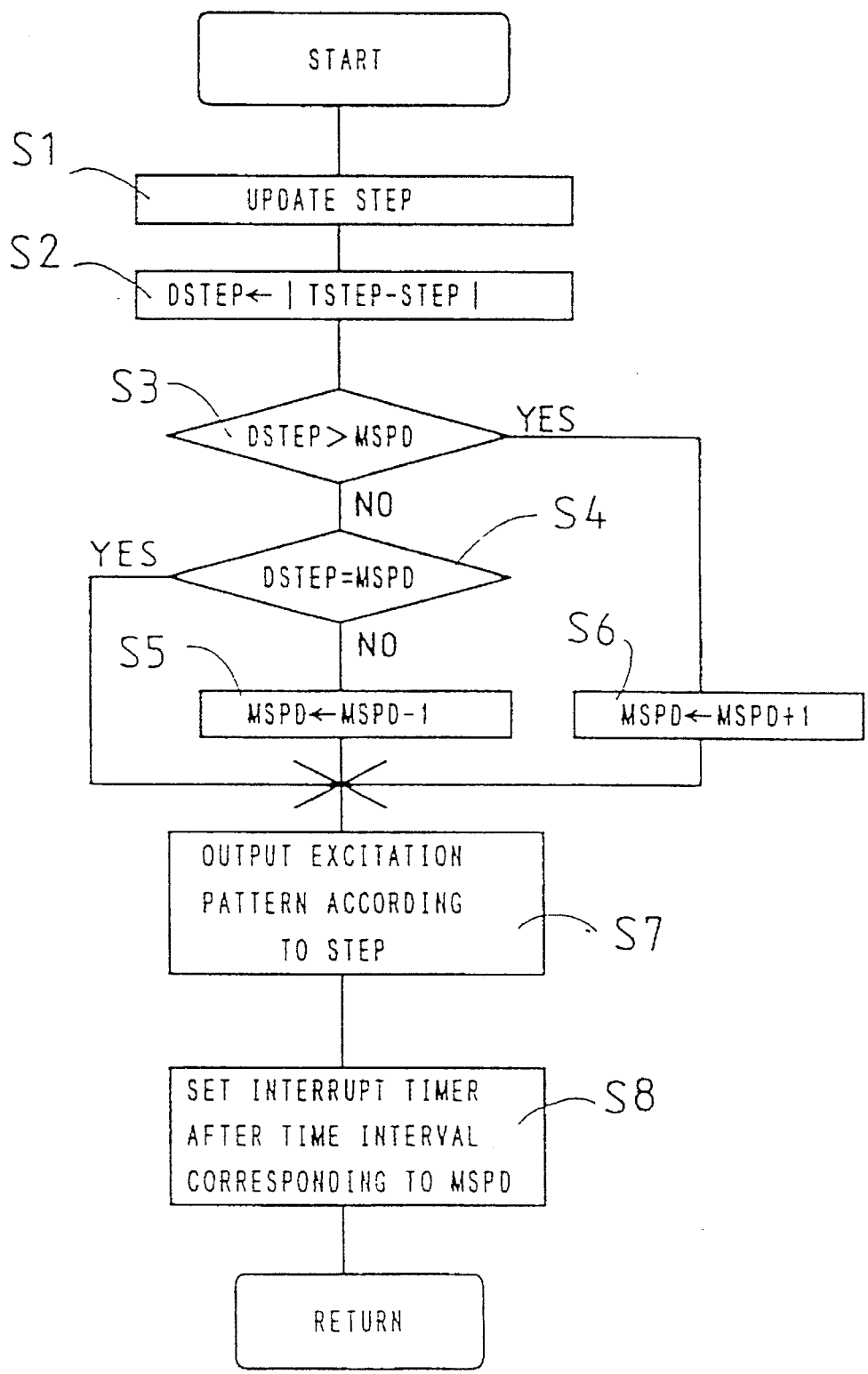
FIG. 3 is a flowchart of steps in which the embodiment works.
Figure 6:
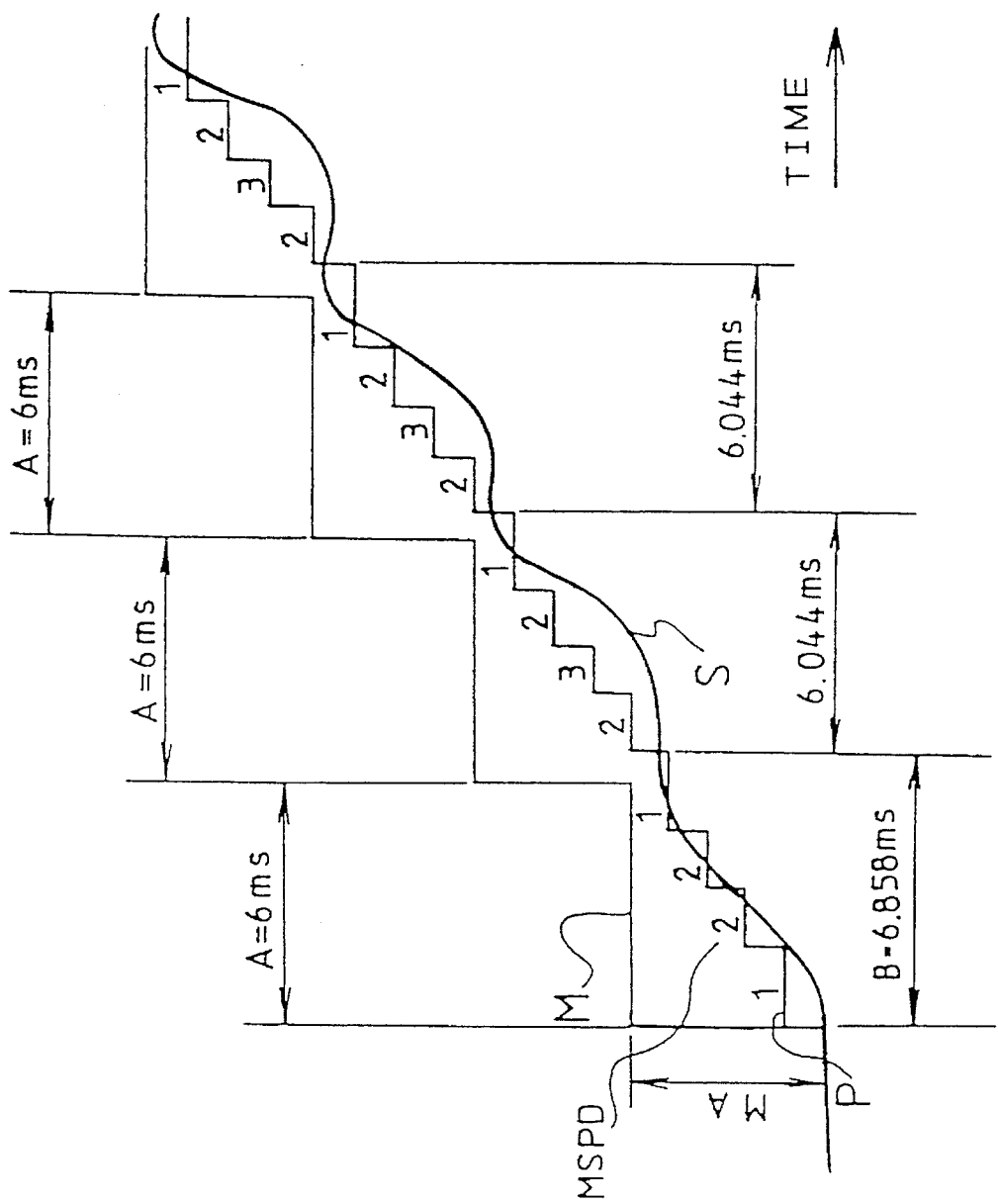
FIG. 6 is a view showing how a step motor is controlled illustratively by a conventional step motor controller.

How the step motor 15 is accelerated and decelerated will now be described. FIG. 3 is a flowchart of steps in which the step motor controller 17, specifically the step motor acceleration and deceleration program 25 therein, operates. The processing of FIG. 3 is started by a timer-based interruption when the step motor 15 completes each of its steps. In step 1 of the flowchart, the current step of the step motor 15 (STEP in FIG. 2) is incremented by 1 toward the target step (TSTEP). In step 2, the step motor acceleration and deceleration program 25 calculates the difference between the target step TSTEP and the current step STEP of the step motor 15, and regards the absolute value of the calculated difference as a step difference DSTEP.

In step 3, the step difference DSTEP is compared with a driving pulse condition MSPD. If the step difference DSTEP is not greater than the driving pulse condition MSPD ("NO" in step 3), step 4 is reached. If the step difference DSTEP is not equal to the driving pulse condition MSPD ("NO" in step 4), step 5 is reached. Now that the step difference DSTEP is found to be smaller than the driving pulse condition MSPD, the value of MSPD is decremented by 1 in step 5. Step 5 is followed by step 7.

If comparing the step difference DSTEP with the driving pulse condition MSPD reveals DSTEP>MSPD ("YES" in step 3), then the value of MSPD is incremented by 1 in step 6. Step 6 is followed by step 7. If the step difference DSTEP is equal to the driving pulse condition MSPD ("YES" in step 4), step 7 is reached without any change in MSPD.

The embodiment involves having a four-phase step motor placed under 1–2 phase excitation control. Thus in step 7, the step motor 15 is excited by use of that pattern in FIG. 4 which corresponds to the low-order three-bit value of the current step of the step motor 15 (STEP) which is characterized by 8 bits. The driving frequency and excitation time of the driving pulses used in the excitation are determined as set forth in FIG. 5. After the stipulated excitation time has elapsed, step 1 is reached again.

The processing of FIG. 3 will now be described in more detail.

When the step motor 15 is in step ST1 of FIG. 2, that step may be taken illustratively as the reference step. In that case, STEP=0; incrementing the step then sets STEP=1 (step 1).

Because TSTEP=6 and STEP=1, DSTEP=5 (step 2). DSTEP>MSPD since MSPD=0 and DSTEP=5 ("YES" in step 3). MSPD is then incremented from 0 to 1 (step 6). An excitation pattern is selected from FIG. 4 based on the low-order three bits of the current step of the motor 15. The selected excitation pattern is applied to the step motor 15 via the driving circuit 18 (step 7). Since MSPD=1, the step motor 15 is fed with driving pulses of a driving frequency of 500 pps (pulse per second) over an excitation time of 2,000 μs (2.000 ms), as set forth in FIG. 5 (step 8). This moves the current position of the step motor 15 (STEP) to step ST2.

Step ST2, in which DSTEP=6−2=4 (step 2) and MSPD=1 ("YES" in step 3), is the same as step ST1 and duplicate description thereof will not be made. MSPD is then incremented to 2 (step 6). The step motor 15 starts to be accelerated toward the target step TSTEP. Now that MSPD=2, the step motor 15 is supplied with driving pulses of a driving frequency of 700 pps over an excitation time of 1.429 ms, as set forth in FIG. 5 (step 8). This moves the current position of the step motor 15 (STEP) to step ST3.

In step ST3, DSTEP=6−3=3 (step 2) and MSPD=2 ("YES" in step 3). MSPD is then incremented to 3 (step 6). The step motor 15 is further accelerated toward the target step TSTEP. Now that MSPD=3, the step motor 15 is supplied with driving pulses of a driving frequency of 843 pps over an excitation time of 1.186 ms, as set forth in FIG. 5 (step 8). This moves the current position of the step motor 15 (STEP) to step ST4.

In step ST4, DSTEP=6−4=2 (step 2) and MSPD=3 ("NO" in step 3). MSPD is then decremented to 2 (step 5). The step motor 15 starts to be decelerated toward the target step TSTEP. Now that MSPD=2, the step motor 15 is supplied with driving pulses of a driving frequency of 700 pps over an excitation time of 1.429 ms, as set forth in FIG. 5 (step 8). This moves the current position of the step motor 15 (STEP) to step ST5.

In step ST5, DSTEP=6−5=1 (step 2) and MSPD=2 ("NO" in step 3). MSPD is then decremented to 1 (step 5). The step motor 15 is further decelerated toward the target step TSTEP. Now that MSPD=1, the step motor 15 is supplied with driving pulses of a driving frequency of 500 pps over an excitation time of 2.000 ms, as set forth in FIG. 5 (step 8). This moves the current position of the step motor 15 (STEP) to step ST6.

In step ST6, the total excitation time B1 accumulated from step ST1 on amounts to 8.044 ms. With the sampling time T=8 ms, the target step TSTEP is changed to 12. Because DSTEP=12−6=6 (step 2) and MSPD=1 ("YES" in step 3), MSPD is incremented to 2 (step 6). The step motor 15 is then accelerated toward the target step TSTEP. Further, similarly to the above, driving process of the step motor 15 is conducted according to the flowchart in FIG. 3.

As shown in FIG. 2, the periods in which to accelerate and decelerate the step motor 15 are: B1=8.044 ms, B2=8.270 ms, and B3=8.270 ms. These periods do not coincide with the period of 6.8 to 5.5 ms corresponding to the natural frequency of 150 to 180 Hz of the system driven by the step motor 15 to actuate the throttle valves 12; or with the period of 13.3 to 11.1 ms or that of 20.0 to 16.6 ms corresponding to those fractional multiples of the natural frequency which range from 75 to 90 Hz and from 50 to 60 Hz.

As described above in detail, the step motor controller 17 of the invention has the sampling time T not coinciding with the period of 6.8 to 5.5 ms corresponding to the natural frequency of 150 to 180 Hz of the system driven by the step motor 15, or with the period of 13.3 to 11.1 ms or of 20.0 to 16.6 ms corresponding to those fractional multiples of the natural frequency which range from 75 to 90 Hz and from 50 to 60 Hz. This connotes that accelerating and decelerating the step motor 15 substantially at intervals of the sampling time does not induce in the throttle valves 12 any resonance with beat vibration, as shown in FIG. 2 by the curvature S. The throttle valves 12 are thus controlled with accuracy, whereby the amount of mixture intake into the engine 11 is precisely controlled. Because stopping the step motor 15 causes little beat vibration in the throttle valves 12, the vibration that does occur at motor stop time subsides in a very short time. This provides for a quick response to any new change in the amount in which the accelerator is operated.

Although the description above contains many specificities, these should not be construed as limiting the scope of the invention but as merely providing illustrations of the presently preferred embodiment of this invention. For example, although the sampling time is set for 8 ms with the above embodiment, any other sampling time will do as long as it does not coincide with the periods of 6.7 to 5.6 ms, 13.3 to 11.1 ms or 20.0 to 16.6 ms; such sampling time will not permit the step motor-driven system for actuating the throttle valves to develop resonance. It should be noted that a sampling time of 20 ms or more can pose problems in keeping up with detecting changes in the amount of accelerator operation; the sampling time should preferably be between 6.8 ms 11.0 ms, or 5.5 mm and less. In another example, although the above embodiment is a step motor controller for actuating the throttle valves, the invention may be applied to any other setups in which the step motor is required to respond quickly to a constantly changing target value.

To sum up, the step motor controller of the invention has a sampling time not coinciding with the period corresponding to the natural frequency of the system driven by the step motor, or with the period corresponding to the fractional multiples of the natural frequency. Because accelerating and decelerating the step motor substantially at intervals of the sampling time does not induce in the throttle valves any resonance with beat vibration, the throttle valves are controlled with accuracy. This in turn allows the amount of mixture intake into the engine to be controlled precisely. Because stopping the step motor entails little beat vibration in the throttle valves, the vibration that does occur at motor stop time settles in a very short time. This ensures a quick response of the step motor-driven system to any new change in the amount of accelerator operation.

What is claimed is:

1. A step motor controller for use in a step motor drive system, comprising:

means for inputting a target value, said target value representing a value of the rotational position at which the step motor is to be stopped;

sampling means for periodically sampling said input target value after a predetermined time interval, said interval lying in a range of 16.6 msec–20.0 msec corresponding to a fractional multiple of the natural frequency of the driving system, the fractional multiple of the natural frequency lying in a range of 50 Hz–60 Hz;

means for determining a difference between said sampled target value and a rotational position of said step motor; and step motor accelerating and decelerating means for accelerating the step motor when said difference is greater than a set value and for decelerating said step motor when said difference is less than the set value.

2. A step motor controller according to claim 1, wherein the fractional multiple of the natural frequency is ⅓ of the natural frequency.

3. A control apparatus for controlling a throttle valve of an engine so as to be opened and closed by utilizing a step motor connected to the throttle valve, the control apparatus comprising:

means for inputting a target value, said target value representing a value of the rotational position at which the step motor is to be stopped;

sampling means for periodically sampling said input target value after a predetermined time interval, said interval lying in a range outside of 11.1 msec–13.3 msec corresponding to a natural frequency of the step motor drive system, the natural frequency lying in a range of 75 Hz–90 Hz;

means for determining a difference between said sampled target value and a rotational position of said step motor;

step motor accelerating and decelerating means for accelerating the step motor when said difference is greater than a set value and for decelerating said step motor when said difference is less than the set value;

means for selecting the predetermined time interval; and means for opening and closing the throttle valve by driving the step motor in accordance with said selected time interval.

4. A control apparatus for controlling a throttle valve of an engine so as to be opened and closed by utilizing a step motor connected to the throttle valve, the control apparatus comprising:

means for inputting a target value, said target value representing a value of the rotational position at which the step motor is to be stopped;

sampling means for periodically sampling said input target value after a predetermined time interval, said interval lying in a range outside of 16.6 msec–20.0 msec corresponding to a natural frequency of the step motor drive system, the natural frequency lying in a range of 50 Hz–60 Hz;

means for determining a difference between said sampled target value and a rotational position of said step motor;

step motor accelerating and decelerating means for accelerating the step motor when said difference is greater than a set value and for decelerating said step motor when said difference is less than the set value;

means for selecting the predetermined time interval; and means for opening and closing the throttle valve by driving the step motor in accordance with said selected time interval.

5. A step motor controller for use in a step motor drive system, comprising:

means for inputting a target value, said target value representing a value of the rotational position at which the step motor is to be stopped;

sampling means for periodically sampling said input target value after a predetermined time interval, said interval lying in a range of 11.1 msec–13.3 msec corresponding to a fractional multiple of the natural frequency of the driving system, the fractional multiple of the natural frequency lying in a range of 75 Hz–90 Hz;

means for determining a difference between said sampled target value and a rotational position of said step motor; and step motor accelerating and decelerating means for accelerating the step motor when said difference is greater than a set value and for decelerating said step motor when said difference is less than the set value.

6. A step motor controller according to claim 5, wherein the fractional multiple of the natural frequency is ½ of the natural frequency.

7. A control apparatus for controlling a throttle valve of an engine so as to be opened and closed by utilizing a step motor connected to the throttle valve, the control apparatus comprising:

means for inputting a target value, said target value representing a value of the rotational position at which the step motor is to be stopped;

sampling means for periodically sampling said input target value after a predetermined time interval, said interval lying in a range outside of 5.5 msec–6.8 msec corresponding to a natural frequency of the step motor drive system, the natural frequency lying in a range of 150 Hz–180 Hz;

means for determining a difference between said sampled target value and a rotational position of said step motor;

step motor accelerating and decelerating means for accelerating the step motor when said difference is greater than a set value and for decelerating said step motor when said difference is less than the set value;

means for selecting the predetermined time interval; and means for opening and closing the throttle valve by driving the step motor in accordance with said selected time interval.

8. The control apparatus according to claim 7, further comprising an intake pipe connected to the engine, the throttle valve being rotatably arranged in the intake pipe.

9. The control apparatus according to claim 7, further comprising:

calculating means for calculating a step number difference based on the difference between the sampled target value and the current rotational position of the step motor;

store means for storing drive conditions of the step motor for every step number;

comparison means for comparing the step number difference calculated by the calculation means with the step number stored in the store means;

wherein the means for opening and closing the throttle valve drives the step motor according to a result of the comparison means.

10. The control apparatus according to claim 9, wherein the drive conditions stored in the store means include a driving frequency and an excitation time of the step motor.

11. The control apparatus according to claim 9, further comprising a memory for storing excitation patterns to excite the step motor and wherein the means for opening and closing the throttle valve drives the step motor based on the excitation patterns.

12. A step motor controller for use in a step motor drive system, comprising:

means for inputting a target value, said target value representing a value of the rotational position at which the step motor is to be stopped;

sampling means for periodically sampling said input target value after a predetermined time interval, said interval lying in a range outside of 5.5 msec–6.8 msec corresponding to a natural frequency of the step motor drive system lying in a range of 150 Hz–180 Hz;

means for determining a difference between said sampled target value and a rotational position of said step motor; and step motor accelerating and decelerating means for accelerating the step motor when said difference is greater than a set value and for decelerating said step motor when said difference is less than the set value.

13. The step motor controller according to claim 12, further comprising a throttle valve connected to the step motor so that the throttle valve is controlled to be opened and closed by the step motor, the throttle valve being rotatably arranged in an intake pipe through which air-fuel mixture is provided with an engine.

14. The step motor controller according to claim 3, wherein the periodic time lies in a range of 6.9 m sec–11.0 m sec.

15. The step motor controller according to claim 4, wherein the periodic time is set to 8 m sec.

\* \* \* \* \*

UNITED STATES PATENT AND TRADEMARK OFFICE
CERTIFICATE OF CORRECTION

PATENT NO. : 5,596,257
DATED : January 21, 1997
INVENTOR(S) : Hiroshi Miyata, et al.

It is certified that error appears in the above-indentified patent and that said Letters Patent is hereby corrected as shown below:

Claim 14, col. 10, line 40, "claim 3" should read --claim 12--.

Claim 15, col. 10, line 43, "claim 4" should read --claim 14--.

Signed and Sealed this

Eighth Day of April, 1997

Attest:

BRUCE LEHMAN

Attesting Officer

Commissioner of Patents and Trademarks